(12) United States Patent
Tsuto et al.

(10) Patent No.: US 11,859,748 B2
(45) Date of Patent: Jan. 2, 2024

(54) JOINT CONNECTION METHOD FOR LONG PIPE, AND METHOD FOR PRODUCING COILED TUBING WITH JOINTS

(71) Applicant: NIPPON STEEL CORPORATION, Tokyo (JP)

(72) Inventors: Akira Tsuto, Tokyo (JP); Hiroyuki Kaitani, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 751 days.

(21) Appl. No.: 17/045,888

(22) PCT Filed: Apr. 10, 2019

(86) PCT No.: PCT/JP2019/015535
§ 371 (c)(1),
(2) Date: Oct. 7, 2020

(87) PCT Pub. No.: WO2019/198733
PCT Pub. Date: Oct. 17, 2019

(65) Prior Publication Data
US 2021/0033237 A1 Feb. 4, 2021

(30) Foreign Application Priority Data

Apr. 13, 2018 (JP) .................. 2018-077855

(51) Int. Cl.
*F16L 47/02* (2006.01)
*B23K 9/235* (2006.01)
(Continued)

(52) U.S. Cl.
CPC .............. *F16L 47/02* (2013.01); *B23K 9/235* (2013.01); *B23K 31/125* (2013.01); *B23K 2101/06* (2018.08)

(58) Field of Classification Search
CPC ...... B23K 9/0282; B23K 9/0284; B23K 9/12; B23K 9/23; B23K 9/235; B23K 31/02;
(Continued)

(56) References Cited

U.S. PATENT DOCUMENTS 4,395,911 A * 8/1983 Macecek ................ G01N 29/26
73/622
2012/0148348 A1 6/2012 Stockstill et al.
(Continued)

FOREIGN PATENT DOCUMENTS

CN 202868193 U 4/2013
JP 2017219315 A 12/2017
(Continued)

*Primary Examiner* — Hung D Nguyen
(74) *Attorney, Agent, or Firm* — Greer Burns & Crain Ltd.

(57) ABSTRACT

A joint connection method is provided that is a method for connecting joints that are used for a hydraulic pressure test or the like to a long pipe by using a production facility which includes a conveyance system, a welding apparatus, a winding apparatus and an X-ray inspection apparatus. The joint connection method includes a step of girth welding a first joint to a front end portion of the long pipe by means of the welding apparatus, a step of inspecting a girth weld zone of the first joint by means of the X-ray inspection apparatus, a step of girth welding a second joint to a rear end portion of the long pipe by means of the welding apparatus, and a step of inspecting a girth weld zone of the second joint by means of the X-ray inspection apparatus.

4 Claims, 6 Drawing Sheets

(51) Int. Cl.
*B23K 31/12* (2006.01)
*B23K 101/06* (2006.01)

(58) Field of Classification Search
CPC .... B23K 31/027; B23K 31/12; B23K 31/125; B23K 37/027; B23K 37/0276; B23K 37/0282; B23K 37/0294; B23K 37/047; B23K 37/053; B23K 37/0531; B23K 2101/06; B23K 2101/10; F16L 47/02; G01N 2223/3303; G01N 2223/3304; G01N 2223/828; G01N 2223/629
See application file for complete search history.

(56) References Cited

U.S. PATENT DOCUMENTS

| | | | |
|---|---|---|---|
| 2015/0330860 A1* | 11/2015 | Koyanagi | G01N 29/04 901/19 |
| 2018/0031152 A1* | 2/2018 | Rajagopalan | F16L 9/02 |
| 2018/0117718 A1* | 5/2018 | Rajagopalan | B23K 9/0284 |

FOREIGN PATENT DOCUMENTS

| | | | |
|---|---|---|---|
| JP | 2017219316 A | 12/2017 | |
| JP | 2017219317 A | 12/2017 | |
| JP | 2018179857 A | 11/2018 | |
| WO | 9831499 A1 | 7/1998 | |

* cited by examiner

JOINT CONNECTION METHOD FOR LONG PIPE, AND METHOD FOR PRODUCING COILED TUBING WITH JOINTS

This is a National Phase Application filed under 35 U.S.C. § 371, of International Application No. PCT/JP2019/015535, filed Apr. 10, 2019, the contents of which are incorporated by reference.

TECHNICAL FIELD

The present invention relates to a joint connection method for a long pipe, which can appropriately connect joints to be used for conducting a hydraulic pressure test or the like to end portions of a long pipe. In the present description, a long pipe is a pipe which is formed by performing girth welding to weld together end portions of a plurality of pipes, and is to be wound around a reel. The present invention also relates to a method for producing coiled tubing with joints that utilizes the joint connection method.

BACKGROUND ART

As disclosed in International Application Publication No. WO199831499 (Patent Literature 1), a pipe wound around a reel that is referred to as "coiled tubing" is already known. The coiled tubing is, for example, unwound from the reel on the sea and is let down into a well of an offshore oil field or offshore gas field or the like. The coiled tubing is, for example, utilized as an umbilical tube that accommodates an umbilical cable which functions as a control line that connects host facility on the ocean and a subsea well. The umbilical tube includes therein an electric wire, a high-pressure hydraulic hose, an optical cable and the like.

Coiled tubing wound around a single reel is generally a long pipe of more than 3,000 feet in length, and therefore a long pipe which is formed by performing girth welding to weld together end portions of a plurality of pipes is widely used as coiled tubing.

A production facility for a long pipe to be used as coiled tubing generally includes a conveyance system, a welding apparatus, and a winding apparatus. The conveyance system conveys pipes in the longitudinal direction. The welding apparatus is disposed along the conveyance system, and performs girth welding to weld together the end portions of a plurality of pipes conveyed by the conveyance system to thereby form a long pipe. The winding apparatus is disposed on the terminal end side of the conveyance system, and winds the long pipe that is conveyed by the conveyance system around a reel.

In general, an X-ray inspection apparatus is used to inspect the girth weld zones of a long pipe. In order to conduct an X-ray inspection of the girth weld zones of a long pipe, for example, it is conceivable to convey coiled tubing produced using the aforementioned production facility to inspection facility separate from the production facility, unwind the long pipe from the reel, and inspect the girth weld zones using an X-ray inspection apparatus provided in the inspection facility.

However, in order to increase the efficiency of the overall process for producing coiled tubing that also includes an inspection step, in the aforementioned production facility for a long pipe it is preferable to wind the long pipe around the reel after subjecting the girth weld zones to X-ray inspection. In Japanese Patent Application Publication No. 2017-219315 (Patent Literature 2), a production facility for a long pipe is proposed in which it is possible to perform an X-ray inspection on girth weld zones of a long pipe.

In this connection, after being wound around a reel, a long pipe to be used as coiled tubing is subjected to a hydraulic pressure test for the purpose of inspecting the quality and the like of the long pipe. Specifically, joints (high-pressure joints) are connected to both end portions of the long pipe, respectively, and water is fed into the inside of the long pipe through one of the joints, and air inside the long pipe is discharged through the other of the joints. When a state is entered in which the inside of the long pipe is filled with water, the water inside the long pipe is pressurized to a high pressure, and both of the joints are blocked with an isolation valve to maintain the pressure. The high pressure state is maintained for a predetermined time period, and changes in the water pressure are observed to thereby determine whether a water leakage occurs due to a defect.

A method that uses a collet chuck-type joint is known as a method for connecting a joint for use in the aforementioned hydraulic pressure test to an end portion of a long pipe. According to this method, a joint is fixed by using a collet chuck to grip the outer surface of an end portion of a long pipe wound around a reel.

However, because in some cases the cross section of a long pipe is not a perfect circle, when a collet chuck-type joint is used there is a risk that a gap will arise between the joint and the outer surface of the long pipe. Therefore, there is a risk that a water leak may occur from the aforementioned gap, and an appropriate hydraulic pressure test will not be performed.

Further, a method that uses a handheld welding machine is known as a method for connecting a joint to an end portion of a long pipe. According to this method, girth welding of a joint to an end portion of a long pipe wound around a reel is performed manually.

However, it is difficult to perform X-ray inspection of a weld zone of a welded joint after being wound around a reel, and whether or not an appropriate girth weld zone is formed so that a water leakage does not occur cannot be adequately confirmed. Therefore, there is a concern regarding the reliability of the connection of the joint.

The above described problem is not necessarily limited to the case of subjecting a long pipe to a hydraulic pressure test, and it is a problem that is common to cases where water is fed into the inside of a long pipe through a joint connected to an end portion of the long pipe, such as in the case of washing the inside of a long pipe.

CITATION LIST

Patent Literature

Patent Literature 1: International Publication No. WO1998/31499
Patent Literature 2: Japanese Patent Application Publication No. 2017-219315

SUMMARY OF INVENTION

Technical Problem

The present invention has been made to solve the aforementioned problem of the prior art. An objective of the present invention is to provide a joint connection method for a long pipe that can appropriately connect joints to be used for conducting a hydraulic pressure test or the like to end portions of a long pipe. Another objective of the present invention is to provide a method for producing coiled tubing with joints by utilizing the aforementioned joint connection method.

Solution to Problem

A joint connection method for a long pipe according to one embodiment of the present invention is a method that connects a first joint and a second joint to a front end portion and a rear end portion of a long pipe, respectively, by using a production facility that includes a conveyance system, a welding apparatus, a winding apparatus and an X-ray inspection apparatus. The conveyance system conveys a pipe in a longitudinal direction. The welding apparatus is disposed along the conveyance system. The welding apparatus performs girth welding that welds together end portions of a plurality of pipes conveyed by the conveyance system to form a long pipe. The winding apparatus is disposed along the conveyance system. The winding apparatus winds the long pipe that is conveyed by the conveyance system around a reel. The X-ray inspection apparatus is disposed between the welding apparatus and the winding apparatus along the conveyance system. The X-ray inspection apparatus inspects a girth weld zone of the long pipe.

The joint connection method includes a first joint girth welding step, a first girth weld zone inspection step, a second joint girth welding step, and a second girth weld zone inspection step. In the first joint girth welding step, the first joint is girth welded to the front end portion of the long pipe by the welding apparatus. In the first girth weld zone inspection step, a girth weld zone of the first joint is inspected by the X-ray inspection apparatus. In the second joint girth welding step, the second joint is girth welded to the rear end portion of the long pipe by the welding apparatus. In the second girth weld zone inspection step, a girth weld zone of the second joint is inspected by the X-ray inspection apparatus.

A production method according to one embodiment of the present invention is a method for producing coiled tubing with joints, the coiled tubing being composed of a long pipe which is wound around a reel, the joints being connected to both end portions of the pipe, respectively, by using a production facility.

The aforementioned production facility includes a conveyance system, a welding apparatus, a winding apparatus and an X-ray inspection apparatus. The conveyance system conveys a pipe in a longitudinal direction. The welding apparatus is disposed along the conveyance system. The welding apparatus girth welds together end portions of a plurality of pipes conveyed by the conveyance system to form a long pipe. The winding apparatus is disposed along the conveyance system. The winding apparatus winds the long pipe that is conveyed by the conveyance system around a reel. The X-ray inspection apparatus is disposed between the welding apparatus and the winding apparatus along the conveyance system. The X-ray inspection apparatus inspects a girth weld zone of the long pipe. In addition, the conveyance system includes, at a position that is furthest on a downstream side in a conveyance direction of the long pipe, pinch rollers that pinch and guide the long pipe.

The production method includes: a first joint girth welding step, a first girth weld zone inspection step, a long pipe formation step, a second joint girth welding step, a second girth weld zone inspection step, an attachment attaching step, an attachment girth welding step, a cutting step, and an attachment detaching step.

In the first joint girth welding step, a first joint is girth welded by the welding apparatus to the front end portion of a pipe that is initially conveyed. In the first girth weld zone inspection step, a girth weld zone of the first joint is inspected by the X-ray inspection apparatus. In the long pipe formation step, a long pipe is formed by repeating steps of performing girth welding to weld together end portions of pipes that follow the pipe to which the first joint is girth welded by means of the welding apparatus, and inspecting girth weld zones of the end portions by means of the X-ray inspection apparatus. In the second joint girth welding step, a second joint is girth welded to a rear end portion of the long pipe by the welding apparatus. In the second girth weld zone inspection step, a girth weld zone of the second joint is inspected by the X-ray inspection apparatus.

In the attachment attaching step, an attachment is attached to a rear end portion of the second joint. In the attachment girth welding step, a front end portion of a different pipe is girth welded to a rear end portion of the attachment by the welding apparatus. In the cutting step, in a state in which the second joint is located in the vicinity of a winding apparatus, the rear end portion of the long pipe to which the second joint is girth welded is fixed to the winding apparatus, thereafter, a region of the different pipe located between the winding apparatus and the pinch rollers is cut. In the attachment detaching step, the attachment is detached from the second joint.

Advantageous Effects of Invention

According to the joint connection method of the present embodiment, joints to be used for conducting a hydraulic pressure test or the like can be appropriately connected to end portions of a long pipe. Further, according to the production method of the present embodiment, coiled tubing with joints can be produced.

DESCRIPTION OF EMBODIMENTS

Embodiments of the present invention are described hereunder. Note that, although embodiments of the present invention are described by way of examples in the following description, the present invention is not limited to the examples described hereunder.

As the result of conducting intensive studies with a view to solving the problem described above, the present inventors focused their attention on utilizing a production facility for a long pipe capable of conducting an X-ray inspection of a girth weld zone of a long pipe as described in Patent Literature 2. Specifically, a welding apparatus included in the production facility for a long pipe is an apparatus whose original purpose is to be used for performing girth welding of end portions of a plurality of pipes to weld the end portions together to form a long pipe. The present inventors had the idea of diverting the welding apparatus for use also in the case of girth welding a joint to an end portion of a long pipe. Further, an X-ray inspection apparatus included in the production facility for a long pipe is an apparatus whose original purpose is to be used for inspecting a girth weld zone of a long pipe. The present inventors had the idea of diverting the X-ray inspection apparatus for use also in a case of inspecting a girth weld zone of a joint. By diverting the aforementioned apparatuses for use as described above, a joint can be girth welded to an end portion of a long pipe by the welding apparatus. In addition, prior to the entire length of the long pipe being wound around a reel of a winding apparatus, a girth weld zone of the joint formed by the girth welding can be inspected by the X-ray inspection apparatus. Thus, the present inventors conceived of enabling appropriate connection of a joint to an end portion of a long pipe by diverting the aforementioned apparatuses for use as described above, and thereby completed the present invention.

A joint connection method for a long pipe according to one embodiment of the present invention is a method for connecting a first joint and a second joint to a front end portion and a rear end portion of a long pipe, respectively, by using a production facility that includes a conveyance system, a welding apparatus, a winding apparatus and an X-ray inspection apparatus. The conveyance system conveys a pipe in a longitudinal direction. The welding apparatus is disposed along the conveyance system. The welding apparatus performs girth welding to weld together end portions of a plurality of pipes conveyed by the conveyance system to thereby form a long pipe. The winding apparatus is disposed along the conveyance system. The winding apparatus winds the long pipe that is conveyed by the conveyance system around a reel. The X-ray inspection apparatus is disposed between the welding apparatus and the winding apparatus along the conveyance system. The X-ray inspection apparatus inspects a girth weld zone of the long pipe.

The joint connection method includes a first joint girth welding step, a first girth weld zone inspection step, a second joint girth welding step and a second girth weld zone inspection step. In the first joint girth welding step, a first joint is girth welded to a front end portion of a long pipe by the welding apparatus. In the first girth weld zone inspection step, a girth weld zone of the first joint is inspected by the X-ray inspection apparatus. In the second joint girth welding step, a second joint is girth welded to a rear end portion of the long pipe by the welding apparatus. In the second girth weld zone inspection step, a girth weld zone of the second joint is inspected by the X-ray inspection apparatus.

According to the joint connection method of the present embodiment, in the first joint girth welding step and the second joint girth welding step, the welding apparatus which the production facility for a long pipe includes is used to girth weld a first joint to a front end portion of a long pipe and to girth weld a second joint to a rear end portion of the long pipe. Therefore, before the entire length of the long pipe is wound around a reel of the winding apparatus, it is possible to form a girth weld zone of the first joint and a girth weld zone of the second joint under the same welding conditions as in the case of forming a girth weld zone of the long pipe.

Further, in the first girth weld zone inspection step and the second girth weld zone inspection step, the X-ray inspection apparatus which the production facility for a long pipe includes is used to inspect a girth weld zone of the first joint and to inspect a girth weld zone of the second joint. Therefore, before the entire length of the long pipe is wound around the reel of the winding apparatus, the girth weld zone of the first joint and the girth weld zone of the second joint are inspected by the X-ray inspection apparatus, and it can be adequately confirmed whether or not appropriate girth weld zones are formed so that a water leakage does not occur. Thus, reliability is obtained with regard to the connections of the first joint and the second joint.

As described above, according to the joint connection method of the present embodiment, a first joint and a second joint can be appropriately connected to a front end portion and a rear end portion of a long pipe, respectively.

Note that, in the present description, the meaning of the following terms is as follows. The term "long pipe" means a jointed pipe in which end portions of two or more pipes are girth welded to each other. The term "girth weld zone of a long pipe" means a girth weld zone formed between end portions of a plurality of pipes for forming a long pipe. The term "girth weld zone of a first joint" means a girth weld zone formed between a front end portion of a long pipe and a first joint. The term "girth weld zone of a second joint" means a girth weld zone formed between a rear end portion of a long pipe and a second joint. The term "front end portion" means the end portion on the downstream side in the conveyance direction of a long pipe. The term "rear end portion" means the end portion on the upstream side in the conveyance direction of a long pipe.

In the joint connection method of the present embodiment, it is preferable to include the following components. The conveyance system includes pinch rollers that pinch and guide a long pipe, at a position that is furthest on the downstream side in the conveyance direction of the long pipe. The joint connection method further includes an attachment attaching step, an attachment girth welding step, a cutting step and an attachment detaching step. In the attachment attaching step, an attachment is attached to a rear end portion of the second joint. In the attachment girth welding step, a front end portion of a different pipe is girth welded to a rear end portion of the attachment by the welding apparatus. In the cutting step, in a state in which the second joint is located in the vicinity of the winding apparatus, the rear end portion of the long pipe to which the second joint is girth welded is fixed to the winding apparatus, thereafter, a region of the aforementioned different pipe located between the winding apparatus and the pinch rollers is cut. In the attachment detaching step, the attachment is detached from the second joint.

In this case, in the cutting step, the long pipe, the second joint, the attachment and the different pipe are interjacent between the winding apparatus and the pinch rollers. Further, the rear end portion of the long pipe in this state is fixed to the winding apparatus. In other words, the rear end portion of the long pipe is fixed to the winding apparatus in a state in which a tensile force is applied to the long pipe wound by the winding apparatus. Therefore, in the cutting step, even when the different pipe is cut, the tensile force of the long pipe wound by the winding apparatus is maintained and the long pipe does not slacken. Next, in the attachment detaching step, by detaching the attachment from the second joint, a region of the different pipe girth welded to the attachment is simultaneously detached from the second joint, and a state is entered in which only the second joint is connected to the rear end portion of the long pipe. It is therefore possible to easily carry out a hydraulic pressure test or the like.

Note that, a pipe (dummy pipe) that will not be a product can be used as the aforementioned "different pipe". However, another long pipe that follows the long pipe which is wound by the winding apparatus may also be used as the "different pipe".

In the joint connection method of the present embodiment, preferably the attachment is a universal joint.

In this case, because the attachment is a universal joint, even if a position at which the long pipe is wound by the winding apparatus and a position at which the long pipe is pinched by the pinch rollers differ from each other in the vertical direction, it is difficult for excessive bending stress to arise at the second joint or the attachment. It is therefore possible to prevent damage to the second joint and the attachment.

A production method according to one embodiment of the present invention is a method for producing coiled tubing with joints, the coiled tubing being composed of a long pipe which is wound around a reel, the joints being connected to both end portions of the pipe, respectively, by using a production facility.

The aforementioned production facility includes a conveyance system, a welding apparatus, a winding apparatus and an X-ray inspection apparatus. The conveyance system conveys a pipe in a longitudinal direction. The welding apparatus is disposed along the conveyance system. The welding apparatus performs girth welding to weld together end portions of a plurality of pipes conveyed by the conveyance system to thereby form a long pipe. The winding apparatus is disposed along the conveyance system. The winding apparatus winds the long pipe that is conveyed by the conveyance system around a reel. The X-ray inspection apparatus is disposed between the welding apparatus and the winding apparatus along the conveyance system. The X-ray inspection apparatus inspects a girth weld zone of the long pipe. In addition, the conveyance system includes pinch rollers that pinch and guide the long pipe, at a position that is furthermost on the downstream side in the conveyance direction of the long pipe.

The production method includes a first joint girth welding step, a first girth weld zone inspection step, a long pipe formation step, a second joint girth welding step, a second girth weld zone inspection step, an attachment attaching step, an attachment girth welding step, a cutting step and an attachment detaching step.

In the first joint girth welding step, a first joint is girth welded by the welding apparatus to the front end portion of a pipe that is initially conveyed. In the first girth weld zone inspection step, a girth weld zone of the first joint is inspected by the X-ray inspection apparatus. In the long pipe formation step, a long pipe is formed by repeating steps of performing girth welding to weld together end portions of pipes that follow the pipe to which the first joint is girth welded by means of the welding apparatus, and inspecting girth weld zones of the end portions by means of the X-ray inspection apparatus. In the second joint girth welding step, a second joint is girth welded to a rear end portion of the long pipe by the welding apparatus. In the second girth weld zone inspection step, a girth weld zone of the second joint is inspected by the X-ray inspection apparatus.

In the attachment attaching step, an attachment is attached to a rear end portion of the second joint. In the attachment girth welding step, a front end portion of a different pipe is girth welded to a rear end portion of the attachment by the welding apparatus. In the cutting step, in a state in which the second joint is located in the vicinity of a winding apparatus, the rear end portion of the long pipe to which the second joint is girth welded is fixed to the winding apparatus, thereafter, a region of the different pipe located between the winding apparatus and the pinch rollers is cut. In the attachment detaching step, the attachment is detached from the second joint.

According to the production method of the present embodiment, coiled tubing with joints can be produced composed of a long pipe which is wound around a reel and to both end portions (a front end portion and a rear end portion) of which joints (a first joint and a second joint) are connected, respectively.

Hereunder, a joint connection method for a long pipe (hereinafter, as appropriate, may also be referred to as simply "joint connection method") according to one embodiment of the present invention is described with reference being made as appropriate to the attached drawings. First, a production facility for a long pipe that is used in the joint connection method according to the present embodiment is described.

<Production Facility for Long Pipe>

Figure 1:
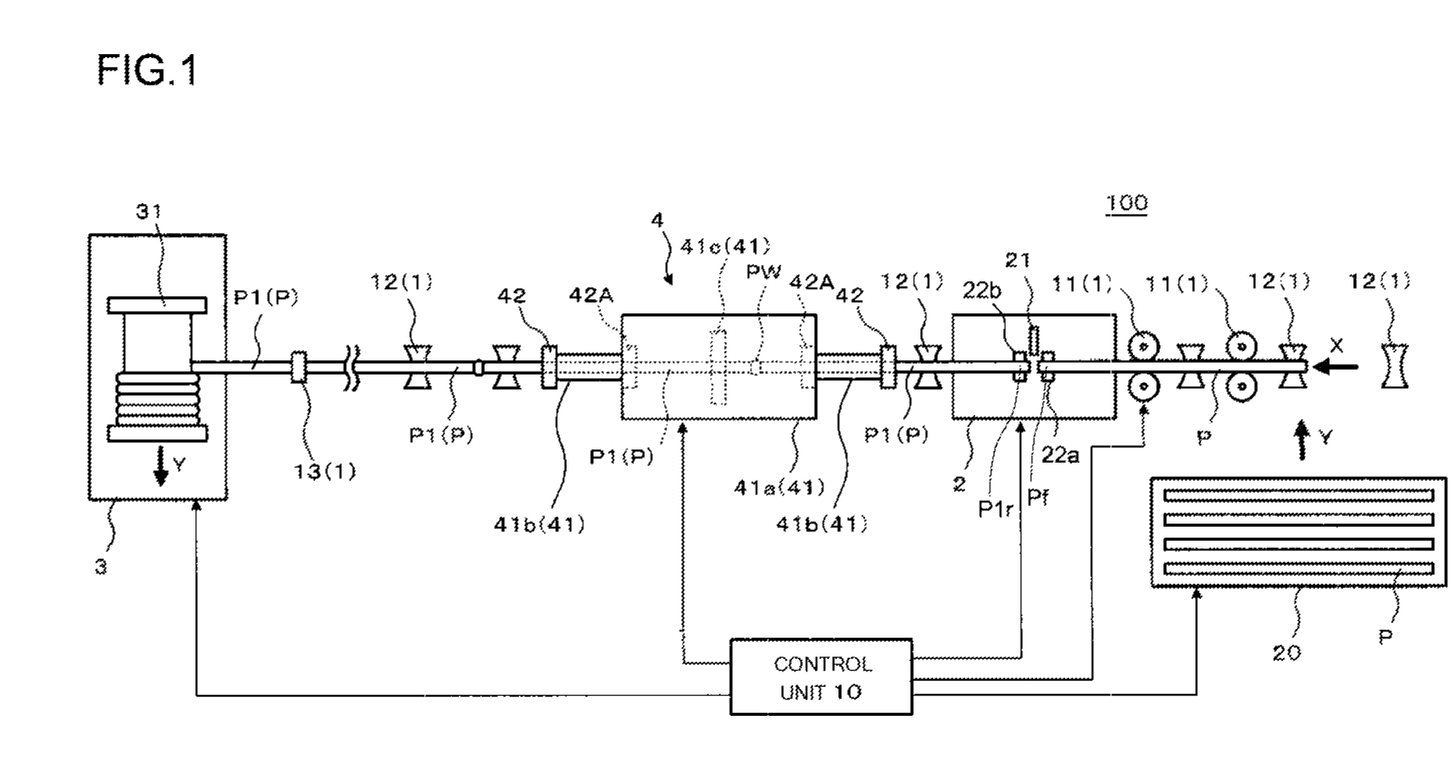
FIG. 1 is a plan view that schematically illustrates an outline configuration of a production facility for a long pipe that is used in a joint connection method for a long pipe according to one embodiment of the present invention.

FIG. 1 is a plan view that schematically illustrates an outline configuration of a production facility for a long pipe that is used in the joint connection method according to the present embodiment.

As illustrated in FIG. 1, a production facility 100 in the present embodiment includes a conveyance system 1, a welding apparatus 2, a winding apparatus 3 and an X-ray inspection apparatus 4. The production facility 100 according to the present embodiment also includes a control unit 10 that controls operations of the conveyance system 1, the welding apparatus 2, the winding apparatus 3 and the X-ray inspection apparatus 4. In addition, the production facility 100 according to the present embodiment includes a carry-in stand 20 on which a plurality of pipes P are placed.

In the production facility 100 in the present embodiment, the welding apparatus 2 and the X-ray inspection apparatus 4 are configured to be movable independently from each other along the conveyance system 1. In other words, the welding apparatus 2 and the X-ray inspection apparatus 4 are configured to be movable independently from each other along the conveyance direction of the pipe P (longitudinal direction of the pipe P). Specifically, for example, driving devices (not illustrated) such as pneumatic cylinders are attached to the welding apparatus 2 and the X-ray inspection apparatus 4, respectively. Wheels (not illustrated) are attached to a lower part of the welding apparatus 2 and the X-ray inspection apparatus 4, respectively. Further, on the floor surface of the production facility 100, a rail (not illustrated) is provided along the conveyance direction of the pipe P. The welding apparatus 2 and the X-ray inspection apparatus 4 are configured so that, by the respective driving devices been driven by the control unit 10, the respective wheels of the welding apparatus 2 and the X-ray inspection apparatus 4 roll on the rail and thus the welding apparatus 2 and the X-ray inspection apparatus 4 can move independently from each other along the conveyance system 1. Therefore, as described later, in a case where it is determined by the X-ray inspection apparatus 4 that a girth weld zone of a long pipe is defective, rewelding and reinspection can be performed without driving the conveyance system 1 and the winding apparatus 3 in the reverse direction (conveying the pipe P in the reverse direction). Further, for example, by adjusting the separation distance between the welding apparatus 2 and the X-ray inspection apparatus 4 in accordance with the length of the pipe P to be subjected to girth welding so as to set the separation distance to a distance that is approximately equal to the length of the pipe P, it is also possible to concurrently perform girth welding by the welding apparatus 2 and inspection of a girth weld zone by the X-ray inspection apparatus 4.

The pipe P in the present embodiment is, for example, a stainless pipe. In a case where a long pipe P1 formed by performing girth welding of the pipe P by means of the welding apparatus 2 is to be used as an umbilical tube, the pipe P is preferably a duplex (two-phase) stainless steel tube. The pipe P may also be an electric-resistance welded pipe or may be a seamless tube.

The conveyance system 1 is a system that is driven by the control unit 10 and conveys the pipe P along a straight line in the longitudinal direction thereof (X-direction illustrated in FIG. 1). Specifically, in the present embodiment, a plurality of pipes P that are placed on the carry-in stand 20 are carried in sequentially in a direction orthogonal to the longitudinal direction of the pipe P toward the conveyance system 1 (Y-direction illustrated in FIG. 1). The plurality of carried-in pipes P are conveyed in the longitudinal direction of the pipe P by the conveyance system 1. Note that, the carry-in stand 20 is equipped with a predetermined carry-in mechanism (not illustrated), and a plurality of pipes P are carried in sequentially when the carry-in mechanism is driven by the control unit 10.

The conveyance system 1 in the present embodiment is equipped with side clamping rollers 11 and V-rollers 12.

The side clamping rollers 11 are disposed so as to pinch the pipe P in the horizontal direction, on the upstream side in the conveyance direction (X direction) of the pipe P relative to the welding apparatus 2. By rotating a motor or the like as a driving source, the side clamping rollers 11 impart a driving force in the longitudinal direction of the pipe P.

The V-rollers 12 are disposed below the pipe P (including the long pipe P1) in a region from a position at which the pipe P is carried in from the carry-in stand 20 to the position of the winding apparatus 3. The V-rollers 12 support the pipe P from below, and rotate accompanying conveyance of the pipe P in the longitudinal direction.

By means of the above configuration, a driving force in the longitudinal direction is imparted by the side clamping rollers 11 to the pipe P before the pipe P is subjected to girth welding by the welding apparatus 2, and to the long pipe P1 before the long pipe P1 is wound around a reel 31 by the winding apparatus 3. A driving force in the longitudinal direction is imparted by the winding apparatus 3 to the long pipe P1 after the long pipe P is wound around the reel 31 by the winding apparatus 3. By this means, the pipe P and the long pipe P1 are each conveyed in the longitudinal direction thereof.

The conveyance system 1 in the present embodiment is also equipped with pinch rollers 13 that pinch and guide the long pipe P1, at a position that is furthest on the downstream side in the conveyance direction of the long pipe P1.

The pinch rollers 13 in the present embodiment are formed from an elastic body such as rubber, and are disposed so as to pinch the long pipe P in the vertical direction.

Note that, although in the present embodiment a configuration that includes the side clamping rollers 11 that impart a driving force and the V-rollers 12 and the pinch rollers 13 that are only driven without imparting a driving force thereto is described as an example of the conveyance system 1, the present embodiment is not limited to this configuration. For example, a configuration may be adopted in which a driving source such as a motor is connected to the pinch rollers 13, so that, by causing the pinch rollers 13 to rotate, a driving force in the longitudinal direction can be imparted to the long pipe P1 after being pinched by the pinch rollers 13. In this case, it is not necessary for the winding apparatus 3 to impart a driving force in the longitudinal direction to the long pipe P1, and it suffices to cause the winding apparatus 3 to rotate so as to maintain a tensile force between the pinch rollers 13 and the winding apparatus 3. Further, it is possible to adopt various configurations as the conveyance system in the present embodiment as long as the configuration can convey the pipe P in the longitudinal direction, such as, for example, a configuration in which a pusher that pushes the pipe P from the upstream side toward the downstream side in the conveyance direction is adopted instead of the side clamping rollers 11.

The welding apparatus 2 is disposed along the conveyance system 1. The welding apparatus 2 is an apparatus that is driven by the control unit 10 and performs girth welding to weld together end portions of a plurality of the pipes P that are conveyed by the conveyance system 1 to thereby form the long pipe P1.

The welding apparatus 2 in the present embodiment includes a girth welding machine (circumferential welding machine) 21, and a pair of gripping apparatuses 22a and 22b which are disposed along the conveyance direction of the pipe P (longitudinal direction of pipe P) in a manner that sandwiches the girth welding machine 21. The welding apparatus 2 in the present embodiment also includes a cooling apparatus (not illustrated). For example, forced-air cooling can be mentioned as an example of the cooling method of the cooling apparatus.

At a timing at which an end portion of each of the pipes P has reached the position at which the girth welding machine 21 is disposed, the control unit 10 stops operation of the conveyance system 1 and the winding apparatus 3 and drives the respective gripping apparatuses 22a and 22b. By this means, the respective gripping apparatuses 22a and 22b grip an end portion of each pipe P. In other words, a front end portion Pf of the pipe P which is positioned on the upstream side in the conveyance direction is gripped by the gripping apparatus 22a which is disposed on the upstream side in the conveyance direction of the pipe P. A rear end portion P1r of the pipe P (the long pipe P1) which is positioned on the downstream side in the conveyance direction is gripped by the gripping apparatus 22b which is disposed on the downstream side in the conveyance direction. Further, the respective gripping apparatuses 22a and 22b adjust the positions of the respective pipes P so that the axial centerlines of the respective pipes P coincide with each other. Next, the control unit 10 drives the girth welding machine 21, and the girth welding machine 21 performs girth welding to weld together end portions of the respective pipes P whose positions had been adjusted. Finally, the control unit 10 drives the cooling apparatus, and the cooling apparatus cools a girth weld zone PW thus formed. After cooling of the girth weld zone PW ends, the control unit 10 releases the grip of the respective gripping apparatuses 22a and 22b, and drives the conveyance system 1 and the winding apparatus 3 to convey the long pipe P1.

The winding apparatus 3 is disposed along the conveyance system 1, on the downstream side in the conveyance direction of the pipe P (the long pipe P1) relative to the welding apparatus 2. The winding apparatus 3 is an apparatus that is driven by the control unit 10 to wind the long pipe P1 which is conveyed by the conveyance system 1 around the reel 31.

Specifically, the winding apparatus 3 in the present embodiment includes a rotation mechanism (not illustrated) that causes the reel 31 to rotate around its own central axis, and a movement mechanism (not illustrated) that causes the reel 31 to move back and forth in the central axis direction (Y-direction). The winding apparatus 3 causes the reel 31 to rotate by means of the rotation mechanism and also causes the reel 31 to move by means of the movement mechanism, to thereby wind the long pipe P1 on the outer surface of the reel 31.

The X-ray inspection apparatus 4 is disposed along the conveyance system 1, between the welding apparatus 2 and the winding apparatus 3. The X-ray inspection apparatus 4 is an apparatus that is driven by the control unit 10, and inspects the girth weld zone PW of the long pipe P1.

At a timing at which the girth weld zone PW of the long pipe P1 formed by the welding apparatus 2 has reached the position at which X-ray inspection apparatus 4 is disposed (specifically, a position at which X-rays are emitted by an X-ray source that the X-ray inspection apparatus 4 includes), the control unit 10 stops operation of the conveyance system 1 and the winding apparatus 3. By this means, the control unit 10 stops the long pipe P1. The control unit 10 then drives the X-ray inspection apparatus 4.

The X-ray inspection apparatus 4 includes an X-ray inspection apparatus main body 41, and X-ray leakage suppressing mechanisms 42 that are mounted in the vicinity of opening portions on an entrance side and an exit side of the X-ray inspection apparatus main body 41. The X-ray inspection apparatus main body 41 inspects the girth weld zone PW of the long pipe P1 in a state in which the long pipe P1 protrudes to the outside from the opening portions on the entrance side (upstream side in the conveyance direction of the long pipe P1) and exit side (downstream side in the conveyance direction of the long pipe P1) of the X-ray inspection apparatus main body 41. The X-ray leakage suppressing mechanisms 42 suppress the leakage of X-rays to outside from the opening portions on the entrance side and exit side of the X-ray inspection apparatus main body 41 while the girth weld zone PW of the long pipe P1 is being inspected by the X-ray inspection apparatus main body 41.

The X-ray inspection apparatus main body 41 includes a housing 41a, a pair of sleeves 41b which is provided on the entrance side and exit side of the housing 41a, respectively, and communicate with the housing 41a, and an X-ray inspection machine 41c which is disposed inside the housing 41a. The X-ray inspection apparatus main body 41 inspects the girth weld zone PW of the long pipe P1 by means of the X-ray inspection machine 41c, in a state in which the long pipe P1 is inserted through the inside of the X-ray inspection machine 41c disposed inside the housing 41a, and the respective sleeves 41b.

The X-ray inspection machine 41c includes a rotation mechanism portion (not illustrated), an X-ray source (not illustrated), an X-ray image detector (not illustrated) and an image processing apparatus (not illustrated).

The X-ray source is attached to the rotation mechanism portion, and when the rotation mechanism portion rotates, the X-ray source rotates in the circumferential direction of the long pipe P1 (that is, about the central axis of the long pipe P1).

The X-ray image detector is disposed at a position that faces the X-ray source with the long pipe P1 interposed therebetween, and is an apparatus which detects X-rays emitted from the X-ray source and transmitted through the long pipe P1, and forms an image based on the detected X-rays. The X-ray image detector is also attached to the rotation mechanism portion, and when the rotation mechanism portion rotates, the X-ray image detector rotates in the circumferential direction of the long pipe P1 integrally with the X-ray source. During rotation of the rotation mechanism portion, the X-ray source and the X-ray image detector maintain a state in which the X-ray source and the X-ray image detector face each other with the long pipe P1 interposed therebetween.

The image processing apparatus is an apparatus that performs image processing on an X-ray image picked up by the X-ray image detector, and inspects a girth weld zone PW of the long pipe P1. By performing image processing on an X-ray image, the image processing apparatus, for example, extracts a picture element region in which the picture element density is large (bright) as a defect region. The image processing apparatus then evaluates the magnitude of the area of the extracted defect region, and determines whether the quality of the girth weld zone PW is good or poor.

As mentioned above, the X-ray leakage suppressing mechanisms 42 are mounted in the vicinity of opening portions on the entrance side and exit side of the X-ray inspection apparatus main body 41. Specifically, the X-ray leakage suppressing mechanisms 42 are mounted in the vicinity of approximately circular opening portions of the pair of sleeves 41b which the X-ray inspection apparatus main body 41 includes. More specifically, among the pair of sleeves 41b, with respect to the sleeve 41b provided on the upstream side in the conveyance direction of the long pipe P, one X-ray leakage suppressing mechanism 42 is mounted in the vicinity of the opening portion on the upstream side thereof, and with respect to the sleeve 41b provided on the downstream side in the conveyance direction of the long pipe P1, the other X-ray leakage suppressing mechanism 42 is mounted in the vicinity of the opening portion on the downstream side thereof. The respective X-ray leakage suppressing mechanisms 42 that are mounted on the entrance side and exit side of the X-ray inspection apparatus main body 41 have the same configuration.

Each of the X-ray leakage suppressing mechanisms 42 includes a blocking member constituted by a plurality of members which are capable of opening and closing in the radial direction (radial direction of the long pipe P1).

When the plurality of members included in the blocking member are at a closed position in the radial direction, an approximately circular opening portion which the long pipe P1 is inserted through is formed on the inner side thereof.

When a girth weld zone PW of the long pipe P1 is to be inspected by the X-ray inspection apparatus main body 41 (that is, when X-rays are to be emitted from the X-ray source), the control unit 10 drives the X-ray leakage suppressing mechanisms 42 so that the plurality of members constituting the respective blocking members move to the closed position in the radial direction. Therefore, after the plurality of members arrive at the closed position in the radial direction, if a girth weld zone PW of the long pipe P1 is inspected by the X-ray inspection apparatus main body 41, it is possible to suppress the leakage of X-rays to the outside from the opening portions of the X-ray inspection apparatus main body 41 (opening portions of the sleeves 41b).

On the other hand, when inspection of the girth weld zone PW of the long pipe P1 by the X-ray inspection apparatus main body 41 ends (that is, irradiation of X-rays from the X-ray source stops) and the long pipe P1 is to be conveyed by the conveyance system 1, the control unit 10 drives the X-ray leakage suppressing mechanisms 42. By this means, the plurality of members constituting the blocking members move to an open position in the radial direction. When the plurality of members are at the open position in the radial direction, the respective blocking members are at a position at which the blocking members do not interfere with the girth weld zone PW of the long pipe P1. Therefore, after the X-ray inspection by the X-ray inspection apparatus main body 41 ends, even if the long pipe P1 is conveyed, there is no risk of the girth weld zone PW of the long pipe P1 being interfered with by the blocking members, and conveyance of the long pipe P1 is not hindered.

Note that, in the present embodiment, in order to suppress the leakage of X-rays even more, as illustrated in FIG. 1, a pair of X-ray leakage suppressing mechanisms 42A having the same configuration as the X-ray leakage suppressing mechanisms 42 are mounted inside the housing 41a.

In a case where a girth weld zone PW of the long pipe P is inspected by the X-ray inspection apparatus 4 described above and it is determined that the girth weld zone PW is normal, the control unit 10 drives the conveyance system 1 and the winding apparatus 3. By this means, the long pipe P1 is conveyed and is wound around the reel 31.

On the other hand, in a case where it is determined by the X-ray inspection apparatus 4 that the girth weld zone PW of the long pipe P is defective, the procedures shown in the following (a) to (c) are executed. At such time, as described above, because the welding apparatus 2 and the X-ray inspection apparatus 4 are capable of moving independently from each other along the conveyance system 1, the control unit 10 causes the welding apparatus 2 and the X-ray inspection apparatus 4 to appropriately move in the conveyance direction of the long pipe P. By this means, it is possible to execute the procedures shown in the following (a) to (c) without conveying the long pipe P1 in the reverse direction. However, where appropriate, it is also possible to execute them after conveying the long pipe P1 in the reverse direction.

(a) Cut off and remove the girth weld zone determined as being defective.
(b) Perform girth welding at the cutting location again.
(c) Inspect the girth weld zone at which the long pipe is re-formed.

Note that, with regard to a more specific configuration of the X-ray inspection apparatus 4 which the production facility 100 in the present embodiment includes, it is possible to adopt the same contents as in the production facility disclosed in Patent Literature 2. In addition, with regard to movement procedures and the like with respect to the welding apparatus 2 and the X-ray inspection apparatus 4 when it is determined by the X-ray inspection apparatus 4 that the girth weld zone PW of the long pipe P1 is defective also, it is possible to adopt the same contents as in the production facility disclosed in Patent Literature 2. Therefore, a more specific description of the configuration and such procedures and the like is omitted here.

However, a production facility for a long pipe that can apply the joint connection method according to the present embodiment described hereunder is not limited to the production facility described in Patent Literature 2, and it suffices that the conveyance system 1, the welding apparatus 2, the X-ray inspection apparatus 4 and the winding apparatus 3 are disposed in that order toward the downstream side in the conveyance direction of the long pipe P1. The production facility may also be a system in which the welding apparatus 2 and the X-ray inspection apparatus 4 are not configured to be movable independently from each other along the conveyance system 1.

<Joint Connection Method>

Hereunder, the joint connection method according to the present embodiment that uses the aforementioned production facility 100 is described.

Figure 2:
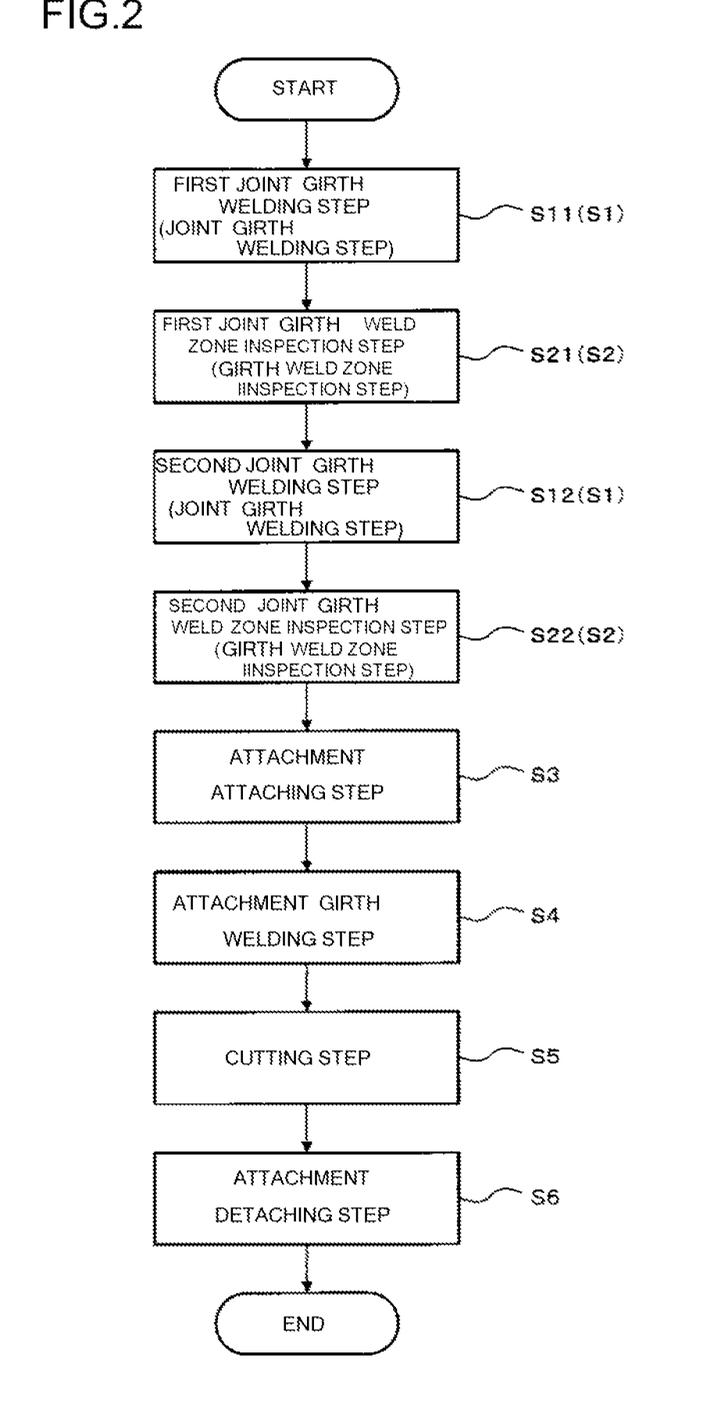
FIG. 2 is a flowchart illustrating an outline of procedures of the joint connection method for a long pipe according to one embodiment of the present invention.

FIG. 2 is a flowchart illustrating an outline of procedures of the joint connection method according to the present embodiment. The joint connection method according to the present embodiment is a method that connects a first joint and a second joint for subjecting the long pipe P1 to a hydraulic pressure test or the like to the front end portion and the rear end portion of the long pipe P, respectively, using the production facility 100.

As illustrated in FIG. 2, the joint connection method according to the present embodiment includes a joint girth welding step S1, a girth weld zone inspection step S2, an attachment attaching step S3, an attachment girth welding step S4, a cutting step S5 and an attachment detaching step S6. The joint girth welding step S1 includes a first joint girth welding step S1 of girth welding a first joint to the front end portion of the long pipe P1, and a second joint girth welding step S12 of girth welding a second joint to the rear end portion of the long pipe P1. The girth weld zone inspection step S2 includes a first joint girth weld zone inspection step S21 of inspecting a girth weld zone of the first joint, and a second joint girth weld zone inspection step S22 of inspecting a girth weld zone of the second joint. Hereunder, each of these steps will be described in turn.

[First Joint Girth Welding Step S11 (Joint Girth Welding Step S1)]

Figure 3A:
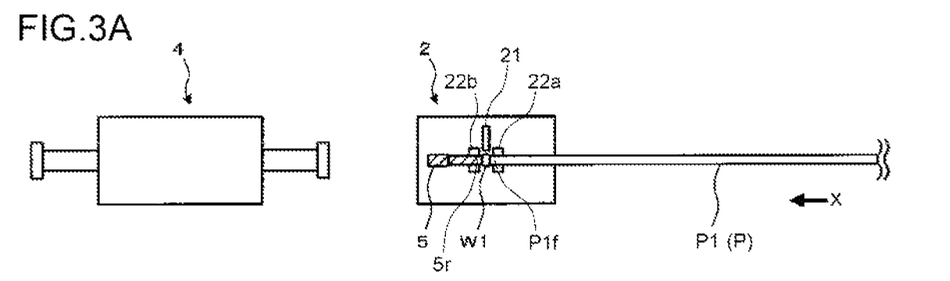
FIG. 3A is a plan view illustrating a state in a first joint girth welding step S11 shown in FIG. 2.
Figure 3B:
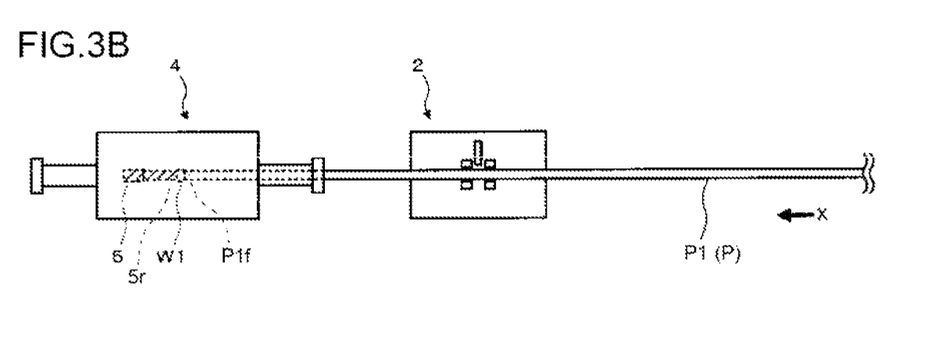
FIG. 3B is a plan view illustrating a state in a first joint girth weld zone inspection step S21 shown in FIG. 2.
Figure 3C:
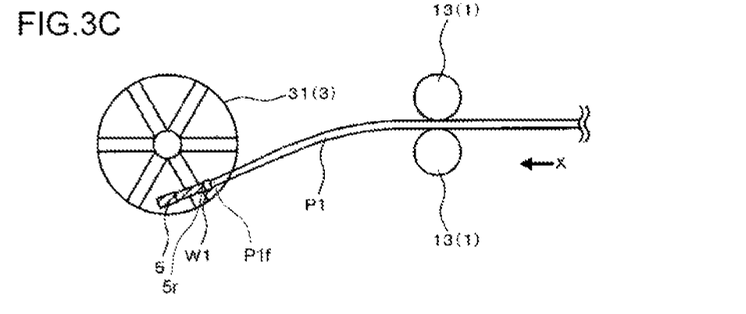
FIG. 3C is a view illustrating a state when a first joint girth welded to a front end portion of a long pipe is fixed to a reel.

FIG. 3A to FIG. 3C are views that schematically illustrate the first joint girth welding step S11 and the first joint girth weld zone inspection step S21. FIG. 3A is a plan view illustrating a state in the first joint girth welding step S11. FIG. 3B is a plan view illustrating a state in the first joint girth weld zone inspection step S21. FIG. 3C is a view illustrating a state when a first joint 5 girth welded to a front end portion P1f of the long pipe P1 is fixed to the reel 31. In FIG. 3C, a side view as seen from a horizontal direction orthogonal to the conveyance direction (X direction) of the long pipe P1 is shown. Note that, in FIG. 3A to FIG. 3C, constituent elements that are the same as constituent elements of the production facility 100 illustrated in FIG. 1 are denoted by the same reference characters as in FIG. 1. This similarly applies with respect to FIG. 4A to FIG. 4D and FIG. 5A to FIG. 5C to be described later.

In the first joint girth welding step S11, as illustrated in FIG. 3A, the first joint 5 is girth welded to the front end portion P1f of the long pipe P1 by the welding apparatus 2. Specifically, the control unit 10 (see FIG. 1) stops operation of the conveyance system 1 (see FIG. 1) at a timing at which the front end portion P1f of the long pipe P1 (or the pipe P prior to being girth welded as illustrated in FIG. 1) reaches the position at which the girth welding machine 21 included in the welding apparatus 2 is disposed. The long pipe P1 in this case is, basically, the pipe P that is initially conveyed. The control unit 10 then drives the welding apparatus 2 according to the same procedures as in the case of performing girth welding (forming a girth weld zone PW (see FIG. 1)) to weld together end portions of the plurality of pipes P (see FIG. 1) described above. By this means, the front end portion P1f of the long pipe P1 and a rear end portion 5r of the first joint 5 are girth welded, and a girth weld zone W1 is formed at the front end portion P1f of the long pipe P1 (the rear end portion 5r of the first joint 5).

More specifically, when performing girth welding of the first joint 5 to the long pipe P1, the gripping apparatus 22a disposed on the upstream side in the conveyance direction grips the front end portion P1f of the long pipe P1. On the other hand, the first joint 5 is set in the gripping apparatus 22b disposed on the downstream side in the conveyance direction, and the gripping apparatus 22b grips the rear end portion 5r of the first joint 5. The respective gripping apparatuses 22a and 22b adjust the position of the front end portion P1f of the long pipe P and the position of the rear end portion 5r of the first joint 5 to cause the axial centerlines thereof to coincide with each other. The front end portion P1f of the long pipe P1 and the rear end portion 5r of the first joint 5 are then girth welded to each by the girth welding machine 21.

Note that, the rear end portion 5r (end portion on the right side in FIG. 3A) of the first joint 5 is preferably formed of a material of the same type and which has the same diameter as the long pipe P1. By this means, it is possible to easily form the girth weld zone W1 under the same welding conditions as the case of forming the girth weld zone PW of the long pipe P1. The front end portion (end portion on the left side in FIG. 3A) of the first joint 5 has, for example, a known structure that, when performing a hydraulic pressure test on the long pipe P1, can be connected (screwed) to a pipe (not illustrated) that supplies water for the hydraulic pressure test, and can maintain sealing performance even under high pressure. For example, the first joint 5 is a threaded connection connectable to a pipe for use in a hydraulic pressure test.

[First Joint Girth Weld Zone Inspection Step S21 (Girth Weld Zone Inspection Step S2)]

In the first joint girth weld zone inspection step S21, as illustrated in FIG. 3B, the girth weld zone W1 of the first joint 5 is inspected by the X-ray inspection apparatus 4. Specifically, the control unit 10 (see FIG. 1) stops operation of the conveyance system 1 (see FIG. 1) at a timing at which the girth weld zone W1 of the first joint 5 has arrived at the position at which the X-ray inspection apparatus 4 is disposed (specifically, the position at which X-rays are emitted by the X-ray source of the X-ray inspection apparatus 4). By this means, the long pipe P1 is stopped. The control unit 10 then drives the X-ray inspection apparatus 4 according to the same procedures as in the case of inspecting the girth weld zone PW (see FIG. 1) described above. By this means, the girth weld zone W1 of the first joint 5 is inspected.

In a case where the girth weld zone W1 is inspected and it is determined that the girth weld zone W1 is normal, as illustrated in FIG. 3C, the control unit 10 (see FIG. 1) drives the conveyance system 1 (see FIG. 1). By this means, the long pipe P1 is conveyed, and is conveyed to the reel 31. The first joint 5 is then fixed to a predetermined location of the winding apparatus 3 (for example, the outer surface of a frame of the reel 31) using a predetermined fixing tool (not illustrated). Thereafter, the long pipe P1 is wound around the reel 31.

On the other hand, in a case where it is determined that the girth weld zone W1 is defective, similarly to the case of the aforementioned girth weld zone PW, the girth weld zone W1 determined as being defective is cutoff and removed. In this case, it suffices to perform girth welding again at the cut-off location, and to inspect the girth weld zone W formed once more. In this case, as necessary, the control unit 10 may cause the welding apparatus 2 and the X-ray inspection apparatus 4 to move in the conveyance direction of the long pipe P1.

After the first joint girth welding step S11 and the first joint girth weld zone inspection step S21, girth welding is performed to weld end portions of the respective pipes P that follow the long pipe P1 to which the first joint 5 is girth welded. The girth welding in this case is performed according to the same procedures as in the case of performing girth welding to weld together the end portions of the plurality of pipes P (see FIG. 1) described above. In addition, each time end portions are girth welded together, the girth weld zone at which the end portions are welded to each other is inspected. The inspection in this case is performed according to the same procedures as in the case of inspecting the girth weld zone PW (see FIG. 1) described above. The long pipe P1 having a predetermined length is formed by repeating these steps of girth welding and inspection.

[Second Joint Girth Welding Step S12 (Joint Girth Welding Step S1)]

Figure 4A:
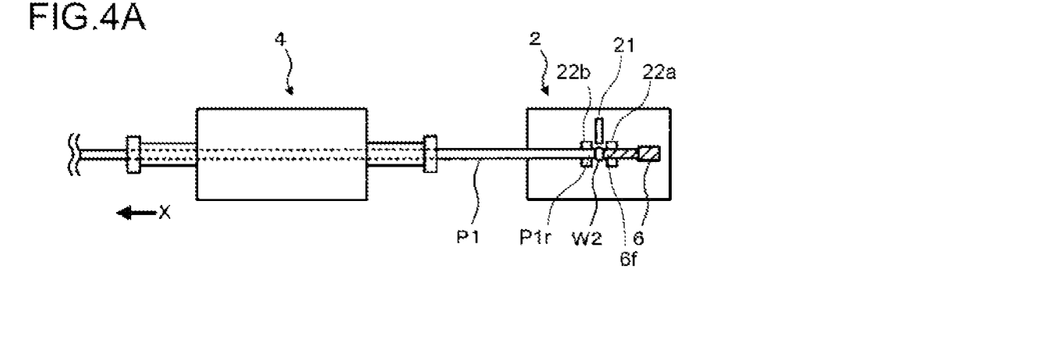
FIG. 4A is a plan view illustrating a state in a second joint girth welding step S12 shown in FIG. 2.
Figure 4B:
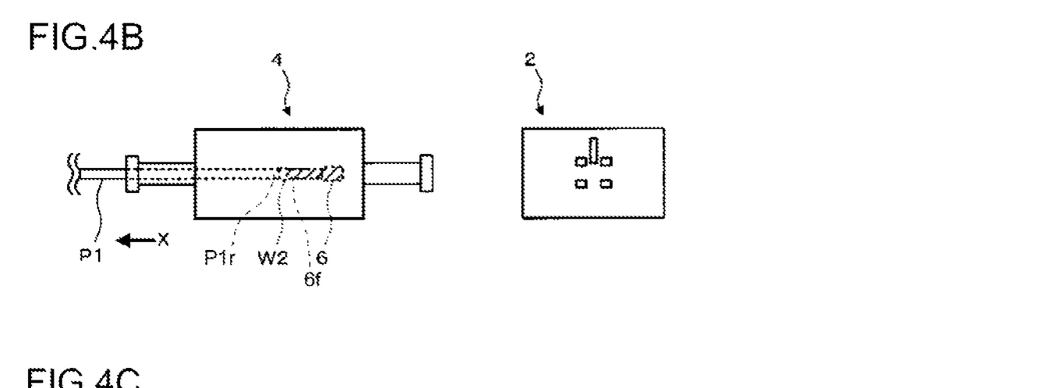
FIG. 4B is a plan view illustrating a state in a second joint girth weld zone inspection step S22 shown in FIG. 2.
Figure 4C:
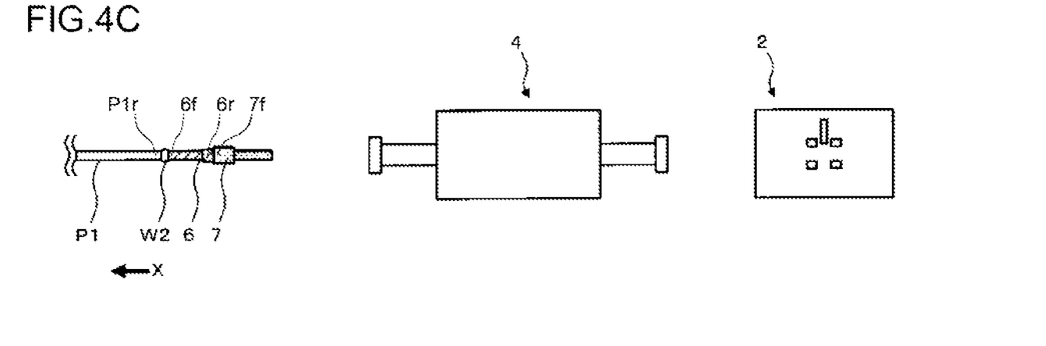
FIG. 4C is a plan view illustrating a state in an attachment attaching step S3 shown in FIG. 2.
Figure 4D:
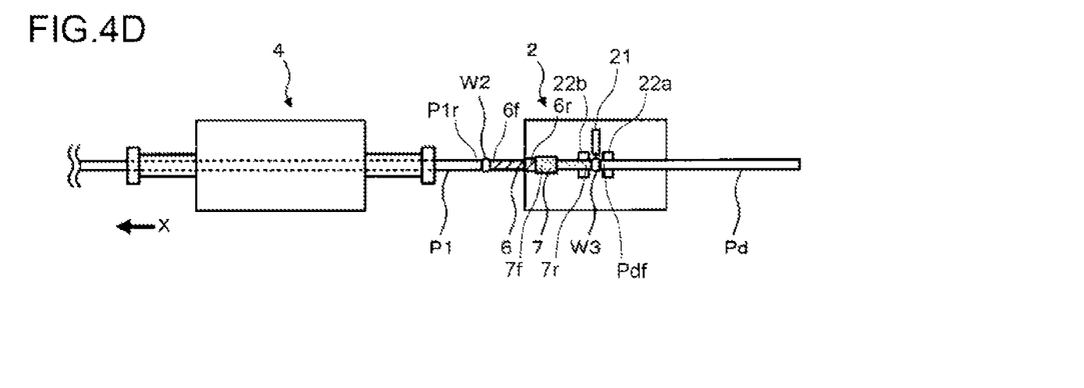
FIG. 4D is a plan view illustrating a state in an attachment girth welding step S4.

FIG. 4A to FIG. 4D are views that schematically illustrate the second joint girth welding step S12, the second joint girth weld zone inspection step S22, the attachment attaching step S3 and the attachment girth welding step S4. FIG. 4A is a view that illustrates a state in the second joint girth welding step S12. FIG. 4B is a view that illustrates a state in the second joint girth weld zone inspection step S22. FIG. 4C is a view that illustrates a state in the attachment attaching step S3. FIG. 4D is a view that illustrates a state in the attachment girth welding step S4. The views shown in FIG. 4A to FIG. 4D are each a plan view.

In the second joint girth welding step S12, as illustrated in FIG. 4A, a second joint 6 is girth welded to the rear end portion P1r of the long pipe P by the welding apparatus 2. Specifically, the control unit 10 (see FIG. 1) stops operation of the conveyance system 1 (see FIG. 1) and the winding apparatus 3 at a timing at which the rear end portion P1r of the long pipe P1 has arrived at the position at which the girth welding machine 21 included in the welding apparatus 2 is disposed. The control unit 10 then drives the welding apparatus 2 according to the same procedures as in the case of performing girth welding (forming the girth weld zone PW (see FIG. 1)) to weld together end portions of the plurality of pipes P (see FIG. 1) described above. By this means, the rear end portion P1r of the long pipe P1 and a front end portion 6f of the second joint 6 are girth welded to each other, and a girth weld zone W2 is formed at the rear end portion P1r of the long pipe P1 (the front end portion 6f of the second joint 6).

More specifically, when performing girth welding of the second joint 6 to the long pipe P1, the gripping apparatus 22b disposed on the downstream side in the conveyance direction grips the rear end portion P1r of the long pipe P1. On the other hand, the second joint 6 is set in the gripping apparatus 22a disposed on the upstream side in the conveyance direction, and the gripping apparatus 22a grips the front end portion 6f of the second joint 6. The respective gripping apparatuses 22a and 22b adjust the position of the rear end portion P1r of the long pipe P1 and the position of the front end portion 6f of the second joint 6 to cause the axial centerlines thereof to coincide with each other. The rear end portion P1r of the long pipe P and the front end portion 6f of the second joint 6 are then girth welded together by the girth welding machine 21.

Note that, the front end portion 6f (end portion on the left side in FIG. 4A) of the second joint 6 is preferably formed of a material of the same type and which has the same diameter as the long pipe P1. By this means, it is possible to easily form the girth weld zone W2 under the same welding conditions as in the case of forming the girth weld zone PW of the long pipe P1. The rear end portion (end portion on the right side in FIG. 4A) of the second joint 6 has, for example, a known structure that, when performing a hydraulic pressure test on the long pipe P1, can be connected (screwed) to a pipe (not illustrated) that discharges water and air used for the hydraulic pressure test, and can maintain sealing performance even under high pressure. For example, the second joint 6 is a threaded connection connectable to a pipe for use in a hydraulic pressure test.

[Second Joint Girth Weld Zone Inspection Step S22 (Girth Weld Zone Inspection Step S2)]

In the second joint girth weld zone inspection step S22, as illustrated in FIG. 4B, the girth weld zone W2 of the second joint 6 is inspected by the X-ray inspection apparatus 4. Specifically, the control unit 10 (see FIG. 1) stops operation of the conveyance system 1 (see FIG. 1) and the winding apparatus 3 at a timing at which the girth weld zone W2 of the second joint 6 has arrived at the position at which the X-ray inspection apparatus 4 is disposed (specifically, the position at which X-rays are emitted by the X-ray source of the X-ray inspection apparatus 4). By this means, the long pipe P1 is stopped. The control unit 10 then drives the X-ray inspection apparatus 4 according to the same procedures as in the case of inspecting the girth weld zone PW (see FIG. 1) described above. By this means, the girth weld zone W2 of the second joint 6 is inspected.

In a case where the girth weld zone W2 is inspected and it is determined that the girth weld zone W2 is normal, the attachment attaching step S3 (see FIG. 2) is executed.

On the other hand, in a case where it is determined that the girth weld zone W2 is defective, similarly to the case of the aforementioned girth weld zone PW, the girth weld zone W2 determined as being defective is cut off and removed. In this case, it suffices to perform girth welding again at the cut-off location, and to inspect the girth weld zone W2 formed once more. In this case, as necessary, the control unit 10 may cause the welding apparatus 2 and the X-ray inspection apparatus 4 to move in the conveyance direction of the long pipe P1.

[Attachment Attaching Step S3]

In the attachment attaching step S3, as illustrated in FIG. 4C, an attachment 7 is attached to a rear end portion 6r of the second joint 6. Attachment of the attachment 7 may be performed, for example, by causing the welding apparatus 2 and the X-ray inspection apparatus 4 to move to the upstream side in the conveyance direction of the long pipe P1 by means of the control unit 10, and thereafter performing manual attachment of the attachment 7 at the position which the X-ray inspection apparatus 4 is at prior to moving.

Although a specific configuration example of the attachment 7 is described later, for example, an internal thread part is formed at a front end portion 7f (end portion on the left side in FIG. 4C) of the attachment 7, and the attachment 7 is attached to the rear end portion 6r of the second joint 6 by screwing together the internal thread part and an external thread part formed at the rear end portion 6r of the second joint 6. In other words, the attachment 7 is detachably attached by means of a threaded connection structure to the second joint 6.

[Attachment Girth Welding Step S4]

In the attachment girth welding step S4, as illustrated in FIG. 4D, a front end portion Pdf of a dummy pipe (a pipe that will not be a product) Pd is girth welded to a rear end portion 7r (end portion on the right side in FIG. 4D) of the attachment 7 by the welding apparatus 2. Specifically, for example, the control unit 10 (see FIG. 1) causes the welding apparatus 2 to move until the rear end portion 7r of the attachment 7 arrives at the position at which the girth welding machine 21 included in the welding apparatus 2 is disposed. Thereafter, the control unit 10 drives the welding apparatus 2 according to the same procedures as in the case of forming the girth weld zone PW (see FIG. 1) described above. By this means, the dummy pipe Pd is girth welded to the rear end portion 7r of the attachment 7, and a girth weld zone W3 is formed at the rear end portion 7r of the attachment 7 (the front end portion Pdf of the dummy pipe Pd).

More specifically, when performing girth welding of the dummy pipe Pd to the attachment 7, the gripping apparatus 22b disposed on the downstream side in the conveyance direction grips the rear end portion 7r of the attachment 7. On the other hand, the dummy pipe Pd is set in the gripping apparatus 22a disposed on the upstream side in the conveyance direction, and the gripping apparatus 22a grips the front end portion Pdf of the dummy pipe Pd. The respective gripping apparatuses 22a and 22b adjust the position of the rear end portion 7r of the attachment 7 and the position of the front end portion Pdf of the dummy pipe Pd to cause the axial centerlines thereof to coincide with each other. The rear end portion 7r of the attachment 7 and the front end portion Pdf of the dummy pipe Pd are then girth welded to each other by the girth welding machine 21.

Note that, a pipe formed of a material of the same type and which has the same diameter as the long pipe P1 is preferably used as the dummy pipe Pd. Further, the rear end portion 7r of the attachment 7 is preferably formed of a material of the same type and which has the same diameter as the long pipe P1. By this means, it is possible to easily form the girth weld zone W3 under the same welding conditions as in the case of forming the girth weld zone PW of the long pipe P1. Note that, in order to confirm that the soundness of the weld, it is desirable to conduct an inspection by means of the X-ray inspection apparatus 4 with respect to the girth weld zone W3 also. However, because the attachment 7 is not used when conducting a hydraulic pressure test or the like on the long pipe P1, inspection by means of the X-ray inspection apparatus 4 need not be performed, and an inspection by visual observation or the like may be performed instead.

[Cutting Step S5]

Figure 5A:
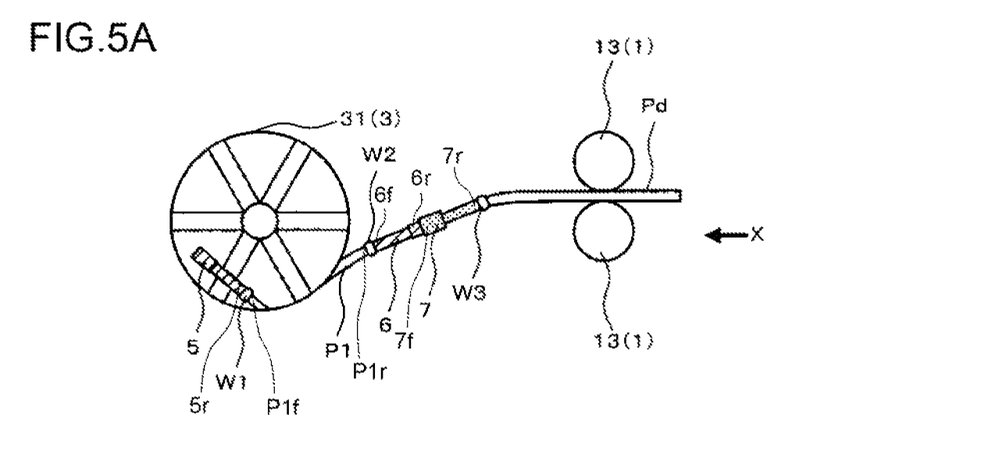
FIG. 5A is a view illustrating a state in an early stage of a cutting step S5 shown in FIG. 2.
Figure 5B:
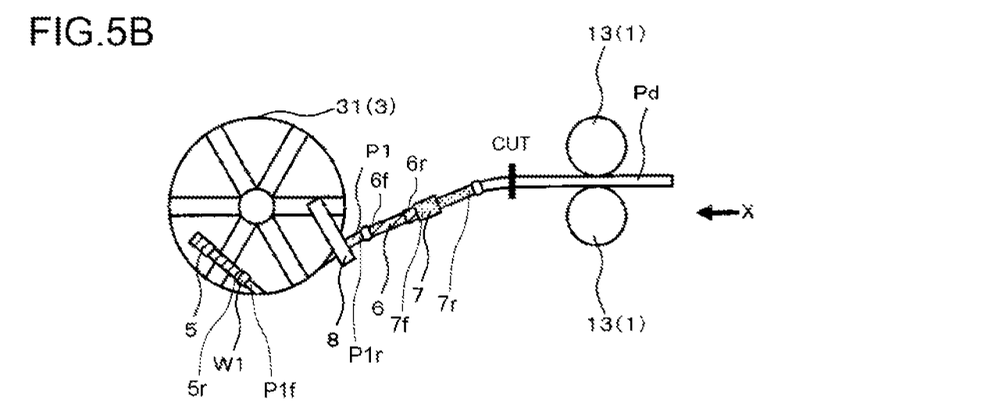
FIG. 5B is a view illustrating a state in a final stage of the cutting step S5 shown in FIG. 2.
Figure 5C:
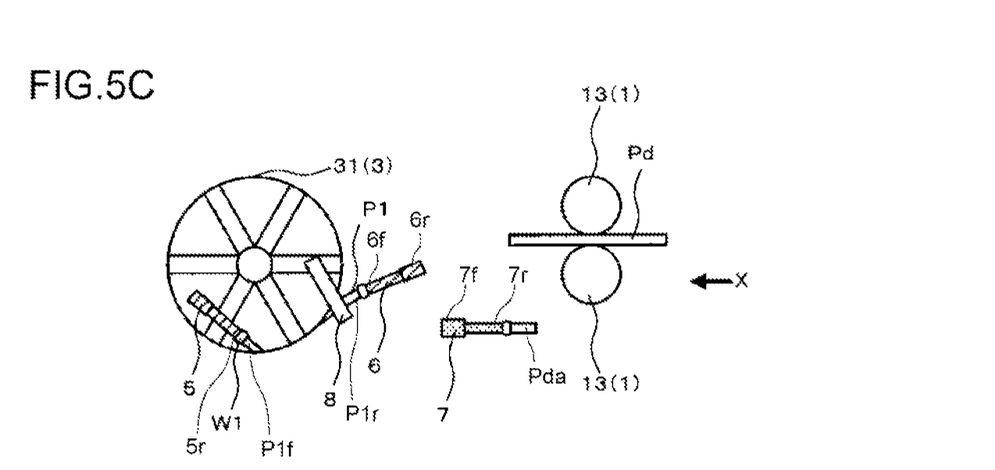
FIG. 5C is a view illustrating a state in an attachment detaching step S6 shown in FIG. 2.

FIG. 5A to FIG. 5C are views that schematically illustrate the cutting step S5 and the attachment detaching step S6. FIG. 5A is a view illustrating a state in an early stage of the cutting step S5. FIG. 5B is a view illustrating a state in the final stage of the cutting step S5. FIG. 5C is a view illustrating a state in the attachment detaching step S6. In each of FIG. 5A to FIG. 5C, a side view as seen from a horizontal direction orthogonal to the conveyance direction (X direction) of the long pipe P1 is shown.

In the cutting step S5, as illustrated in FIG. 5A, a state is entered in which the second joint 6 is positioned in the vicinity of the winding apparatus 3. Specifically, the control unit 10 (see FIG. 1) stops operation of the conveyance system 1 (see FIG. 1) and the winding apparatus 3 at a timing at which the second joint 6 (the rear end portion P1r of the long pipe P1) has reached a position in the vicinity of the reel 31 included in the winding apparatus 3.

Next, as illustrated in FIG. 5B, the rear end portion P1r of the long pipe P1 to which the second joint 6 is girth welded is fixed to the winding apparatus 3 (frame of the reel 31) using a predetermined fixing tool 8. Thereafter, a region of the dummy pipe Pd that is a region located between the winding apparatus 3 and the pinch rollers 13 is cut. For example, a tool having a configuration in which one end is attached (fastened by bolts) to the winding apparatus 3, and the other end pinches the rear end portion P1r of the long pipe P1 can be used as the fixing tool 8. Cutting of the dummy pipe Pd can be performed, for example, manually by a worker using a portable cutting machine.

Note that, as illustrated in FIG. 5A and FIG. 5B, the dummy pipe Pd has at least a length such that, when the second joint 6 reaches a position in the vicinity of the winding apparatus 3 (the reel 31), the dummy pipe Pd can be pinched by the pinch rollers 13 in a state in which the dummy pipe Pd is girth welded to the rear end portion 7r of the attachment 7.

[Attachment Detaching Step S6]

In the attachment detaching step S6, as illustrated in FIG. 5C, the attachment 7 is detached from the second joint 6. It suffices to perform detachment of the attachment 7 by manually releasing the screwed connection between the internal thread part formed at the front end portion 7f of the attachment 7 and the external thread part formed at the rear end portion 6r of the second joint 6. At such time, a part Pda of the dummy pipe Pd girth welded to the rear end portion 7r of the attachment 7 will also be detached together with the attachment 7.

Note that, in the case of reusing the attachment 7, although the attachment 7 may be used after removing the part Pda of the dummy pipe Pd girth welded thereto, it is also possible to use the attachment 7 in a condition in which the part Pda of the dummy pipe Pd is not removed and remains girth welded thereto. In other words, it is also possible to use the remaining part Pda of the dummy pipe Pd as the rear end portion 7r of the attachment 7.

In this way coiled tubing with joints can be produced in which the coiled tubing is composed of the long pipe P1 which is would around the reel 31 and to both end portions (the front end portion P1f and the rear end portion P1r) of which joints (the first joint 5 and the second joint 6) are connected, respectively.

Figure 6A:
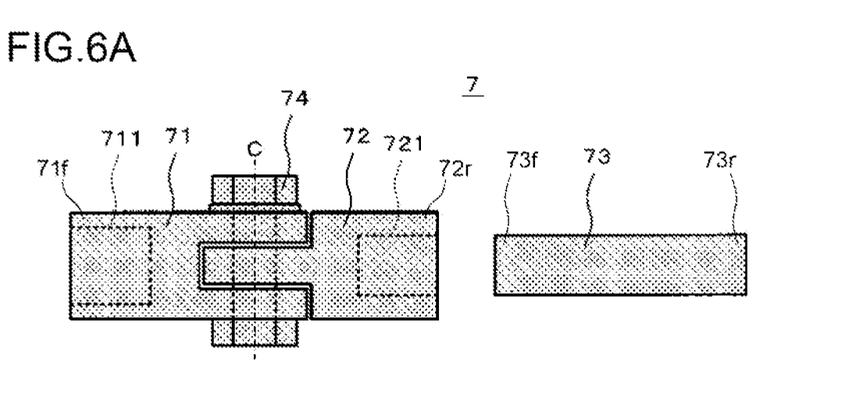
FIG. 6A is a view illustrating a specific configuration example of an attachment, which illustrates a state in which a part of the members constituting the attachment has been detached.
Figure 6B:
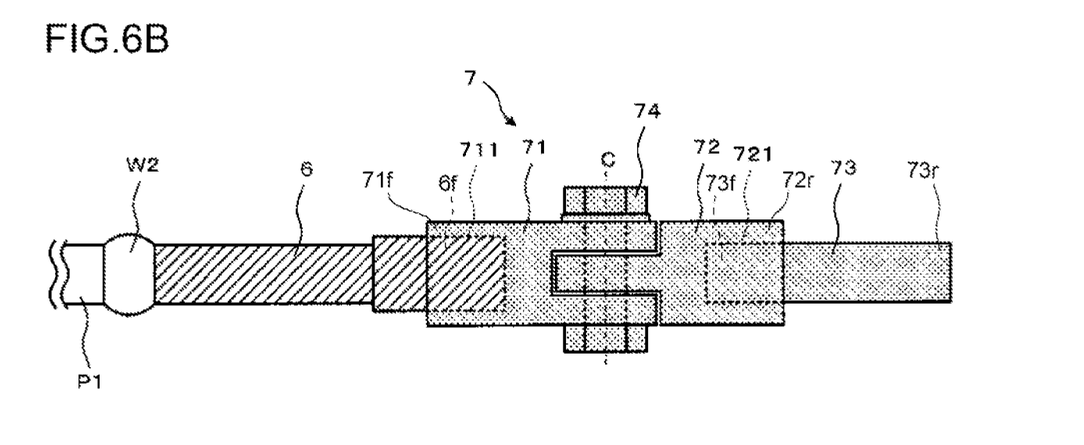
FIG. 6B is a view illustrating a specific configuration example of an attachment, which illustrates a state in which the attachment is attached to a rear end portion of a second joint.

FIG. 6A and FIG. 6B are views that illustrate a specific configuration example of the attachment 7 in the present embodiment. FIG. 6A is a view that illustrates a state in which one member (a third member 73) among the members constituting the attachment 7 has been detached. FIG. 6B is a view that illustrates a state in which the attachment 7 is attached to the rear end portion of the second joint 6.

As illustrated in FIG. 6A and FIG. 6B, the attachment 7 includes a first member 71 that is substantially circular in cross section, a second member 72 that is substantially circular in cross section, a third member 73 that is substantially circular in cross section, and a shaft member 74 constituted by a bolt or a nut. The respective cross-sectional shapes of the first member 71 and the second member 72 are not particularly limited, and may be substantially rectangular. The first member 71 and the second member 72 are connected in a manner in which the first member 71 and the second member 72 are capable of turning about a central axis C of the shaft member 74. In other words, the attachment 7 is a universal joint (single-shaft universal joint) in which the first member 71 and the second member 72 are capable of freely turning about the central axis C. A rear end portion 73r (end portion on the right side in FIG. 6A and FIG. 6B) of the third member 73 is preferably formed of a material of the same type and which has the same diameter as the dummy pipe Pd.

An internal thread part 721 is formed at a rear end portion 72r (end portion on the right side in FIG. 6A and FIG. 6B) of the second member 72. An external thread part is formed at a front end portion 73f (end portion on the left side in FIG. 6A and FIG. 6B) of the third member 73. As illustrated in FIG. 6B, the attachment 7 is assembled by manually screwing together the aforementioned external thread part and the internal thread part 721. In other words, the third member 73 is detachably attached to the second member 72 by means of a threaded connection.

Similarly, an internal thread part 711 is formed at a front end portion 71f (end portion on the left side in FIG. 6A and FIG. 6B) of the first member 71. An external thread part is formed at the rear end portion 6r of the second joint 6. As illustrated in FIG. 6B, the attachment 7 is attached to the rear end portion 6r of the second joint 6 by manually screwing together the aforementioned external thread part and the internal thread part 711. In other words, the attachment 7 is detachably attached to the second joint 6 by means of a threaded connection.

According to the joint connection method of the present embodiment described above, before the entire length of the long pipe P1 is wound around the reel 31 of the winding apparatus 3, it is possible to form the girth weld zone W1 of the first joint 5 and the girth weld zone W2 of the second joint 6 by means of the welding apparatus 2 under the same welding conditions as in the case of forming the girth weld zone PW of the long pipe P1.

Further, before the entire length of the long pipe P1 is wound around the reel 31 of the winding apparatus 3, the girth weld zone W1 of the first joint 5 and the girth weld zone W2 of the second joint 6 are inspected by the X-ray inspection apparatus 4, and it can be adequately confirmed whether or not the girth weld zones W1 and W2 are formed in an appropriate manner so that a water leakage does not occur. Therefore, reliability is obtained with regard to the connections of the first joint 5 and the second joint 6.

Thus, according to the joint connection method of the present embodiment, the first joint 5 and the second joint 6 can be appropriately connected to the front end portion P1f and the rear end portion P1r of the long pipe P1, respectively.

Further, according to the joint connection method of the present embodiment, in the cutting step S5, as illustrated in FIG. 5B, the long pipe P1, the second joint 6, the attachment 7 and the dummy pipe Pd are interjacent between the winding apparatus 3 and the pinch rollers 13. In this state, the rear end portion P1r of the long pipe P1 to which the second joint 6 has been girth welded is fixed to the winding apparatus 3 using the fixing tool 8. In other words, in a state in which a tensile force is applied to the long pipe P1 wound by the winding apparatus 3, the rear end portion P1r of the long pipe P is fixed to the winding apparatus 3. Therefore, in the cutting step S5, even when the dummy pipe Pd is cut, the tensile force of the long pipe P1 wound by the winding apparatus 3 is maintained and the long pipe P1 does not slacken. In other words, a state in which the long pipe P1 is tightly wound can be maintained, and the winding state does not become undone. Subsequently, in the attachment detaching step S6, as illustrated in FIG. 5C, by detaching the attachment 7 from the second joint 6, a state is entered in which only the second joint 6 is connected to the rear end portion P1r of the long pipe P1. Therefore, it is possible to easily conduct a hydraulic pressure test or the like.

In addition, according to the joint connection method of the present embodiment, the attachment 7 is a universal joint. Therefore, as illustrated in FIG. 5B, even if the position at which the long pipe P is wound by the winding apparatus 3 and the position at which the dummy pipe Pd is pinched by the pinch rollers 13 differ from each other in the vertical direction, it is difficult for excessive bending stress to arise at the second joint 6 or the attachment 7. It is therefore possible to prevent damage to the second joint 6 and the attachment 7.

Note that, in the present embodiment, although the second joint girth welding step S12, the second joint girth weld zone inspection step S22, the attachment attaching step S3 and the attachment girth welding step S4 are executed in this order, the present embodiment is not limited thereto. For example, it is possible to execute the attachment attaching step S3, and thereafter execute the second joint girth welding step S12. In this case, in the second joint girth welding step S12, by girth welding the second joint 6 to the rear end portion P1r of the long pipe P1 by means of the welding apparatus 2, the second joint 6 and the attachment 7 will be connected at the same time to the rear end portion P1r of the long pipe P1. Further, in this case, after the second joint girth welding step S12, either step among the second joint girth weld zone inspection step S22 and the attachment girth welding step S4 may be executed first. However, in a case where it is determined as a result of executing the second joint girth weld zone inspection step S22 that the girth weld zone W2 is defective, it is necessary to perform an operation such as cutting off the girth weld zone W2. Therefore, when taking into account the ease of performing operations, it is preferable to execute the second joint girth weld zone inspection step S22 prior to execution of the attachment girth welding step S4.

Note that, a pipe to be used as a pipe to be girth welded to the rear end portion P1r of the attachment 7 is not limited to the dummy pipe Pd, and it is also possible to use another long pipe (a long pipe that will be a product) P1 which follows the long pipe P1 which is wound by the winding apparatus 3.

In a case where another long pipe P1 which follows the long pipe P which is wound by the winding apparatus 3 is used as the pipe to be girth welded to the rear end portion P1r of the attachment 7, and not the dummy pipe Pd that is used in the present embodiment, the joint connection method according to the present embodiment is executed in order from the first joint girth welding step S11 with respect to the aforementioned following other long pipe P1 also. When the attachment detaching step S6 is executed with respect to the long pipe P wound by the winding apparatus 3, the following other long pipe P1 is in a state in which it is pinched by the pinch rollers 13. Therefore, when executing the first joint girth welding step S11 with respect to the following other long pipe P1, it suffices to convey the following other long pipe P1 in the reverse direction until the front end portion P1f of the following other long pipe P1 reaches the position at which the girth welding machine 21 is disposed.

Furthermore, according to the production method of the present embodiment, by utilizing the joint connection method of the present embodiment, coiled tubing with joints can be produced in which the coiled tubing is composed of the long pipe P1 which is wound around the reel 31 and to both end portions (the front end portion P1f and the rear end portion P1r) of which joints (the first joint 5 and the second joint 6) are connected, respectively.

REFERENCE SIGNS LIST

1 Conveyance System
2 Welding Apparatus
3 Winding Apparatus
4 X-ray Inspection Apparatus
5 First Joint
6 Second Joint
7 Attachment
8 Fixing Tool
10 Control Unit
31 Reel
100 Production facility for a Long Pipe
P Pipe
P1 Long Pipe
Pd Different Pipe (Dummy Pipe)
PW, W1, W2, W3 Girth Weld Zone

The invention claimed is:

1. A joint connection method for a long pipe for connecting a first joint and a second joint to a front end portion and rear end portion of the long pipe, respectively, by using a production facility which comprises: a conveyance system which conveys a pipe in a longitudinal direction; a welding apparatus which is disposed along the conveyance system and which performs girth welding that welds together end portions of a plurality of pipes conveyed by the conveyance system to form a long pipe; a winding apparatus which is disposed along the conveyance system and which winds the long pipe that is conveyed by the conveyance system around a reel; and an X-ray inspection apparatus which is disposed between the welding apparatus and the winding apparatus along the conveyance system and which inspects a girth weld zone of the long pipe;

the joint connection method comprising:
a first joint girth welding step of girth welding the first joint to a front end portion of the long pipe by means of the welding apparatus,
a first girth weld zone inspection step of inspecting a girth weld zone of the first joint by means of the X-ray inspection apparatus,
a second joint girth welding step of girth welding the second joint to a rear end portion of the long pipe by means of the welding apparatus, and
a second girth weld zone inspection step of inspecting a girth weld zone of the second joint by means of the X-ray inspection apparatus.

2. The joint connection method for a long pipe according to claim 1, wherein:
the conveyance system comprises pinch rollers that pinch and guide the long pipe, at a position that is furthest on a downstream side in a conveyance direction of the long pipe, and
the joint connection method further comprises:
an attachment attaching step of attaching an attachment to a rear end portion of the second joint;

an attachment girth welding step of girth welding a front end portion of a different pipe to a rear end portion of the attachment by means of the welding apparatus;

a cutting step of, in a state in which the second joint is located in a vicinity of the winding apparatus, fixing the rear end portion of the long pipe to which the second joint is girth welded to the winding apparatus, and thereafter cutting a region of the different pipe located between the winding apparatus and the pinch rollers; and an attachment detaching step of detaching the attachment from the second joint.

3. The joint connection method for a long pipe according to claim 2, wherein:

the attachment is a universal joint.

4. A method for producing coiled tubing with joints in which the coiled tubing is composed of a long pipe wound around a reel, the joints being connected to both end portions of the pipe, respectively, by using a production facility, wherein:

the production facility comprises:

a conveyance system which conveys a pipe in a longitudinal direction, a welding apparatus which is disposed along the conveyance system and which performs girth welding that welds together end portions of a plurality of pipes conveyed by the conveyance system to form a long pipe, a winding apparatus which is disposed along the conveyance system and which winds the long pipe that is conveyed by the conveyance system around a reel, and an X-ray inspection apparatus which is disposed between the welding apparatus and the winding apparatus along the conveyance system and which inspects a girth weld zone of the long pipe;

the conveyance system comprises pinch rollers that pinch and guide the long pipe, at a position that is furthest on a downstream side in a conveyance direction of the long pipe; and the production method comprises:

a first joint girth welding step of girth welding a first joint to a front end portion of the pipe that is initially conveyed, by means of the welding apparatus, a first girth weld zone inspection step of inspecting a girth weld zone of the first joint by means of the X-ray inspection apparatus, a long pipe formation step of forming the long pipe by repeating steps of performing girth welding to weld together end portions of pipes that follow the pipe to which the first joint is girth welded by means of the welding apparatus, and further inspecting girth weld zones of the end portions by means of the X-ray inspection apparatus, a second joint girth welding step of girth welding a second joint to a rear end portion of the long pipe by means of the welding apparatus, a second girth weld zone inspection step of inspecting a girth weld zone of the second joint by means of the X-ray inspection apparatus, an attachment attaching step of attaching an attachment to a rear end portion of the second joint, an attachment girth welding step of girth welding a front end portion of a different pipe to a rear end portion of the attachment by means of the welding apparatus, a cutting step of, in a state in which the second joint is located in a vicinity of the winding apparatus, fixing the rear end portion of the long pipe to which the second joint is girth welded to the winding apparatus, and thereafter cutting a region of the different pipe located between the winding apparatus and the pinch rollers; and an attachment detaching step of detaching the attachment from the second joint.

\* \* \* \* \*